United States Patent [19]

Jessop

[11] Patent Number: 4,779,941

[45] Date of Patent: Oct. 25, 1988

[54] TRACK SYSTEM FOR MOVING PROCESSOR IN AND OUT OF CABINET

[75] Inventor: Thomas C. Jessop, Webster, N.Y.

[73] Assignee: Eastman Kodak Company, Rochester, N.Y.

[21] Appl. No.: 146,456

[22] Filed: Jan. 21, 1988

[51] Int. Cl.⁴ .................................. A47B 88/00
[52] U.S. Cl. ................................. 312/311; 312/250
[58] Field of Search ........... 312/250, 255, 246, 321, 312/301, 298, 311; 248/129; 296/61; 238/10 R; 104/164, 242, 243, 249, 250, 254; 211/151, 162

[56] References Cited

U.S. PATENT DOCUMENTS

| | | | |
|---|---|---|---|
| 1,091,393 | 3/1914 | Schulde et al. | 312/311 |
| 1,119,544 | 12/1914 | Schmidt | 312/311 |
| 1,401,219 | 12/1921 | Wheary | 312/321 X |
| 2,129,539 | 9/1938 | Steenstrup | 104/250 |
| 3,443,330 | 5/1969 | Scott | 312/311 X |
| 4,123,126 | 10/1978 | Querengasser | 321/201 |
| 4,462,500 | 7/1984 | Konstant et al. | 211/151 |
| 4,621,876 | 11/1986 | Reimer | 312/250 |

Primary Examiner—Joseph Falk
Attorney, Agent, or Firm—Robert H. Sproule

[57] ABSTRACT

A system of parallel and pivotally mounted tracks (25) allows a processor (15) on wheels (16) to be rolled in and out of a cabinet (10) for servicing. In an upright position, tracks (27) can be latched to the cabinet to hold the processor in its operating position; and when pivoted down to a horizontal position, tracks (27) support the processor for rolling out of the cabinet to a servicing position where the processor is accessible. A latch (30) for latching the tracks upright is preferably combined with leveler feet (35) that establish a proper elevation of the tracks outside the cabinet.

6 Claims, 4 Drawing Sheets

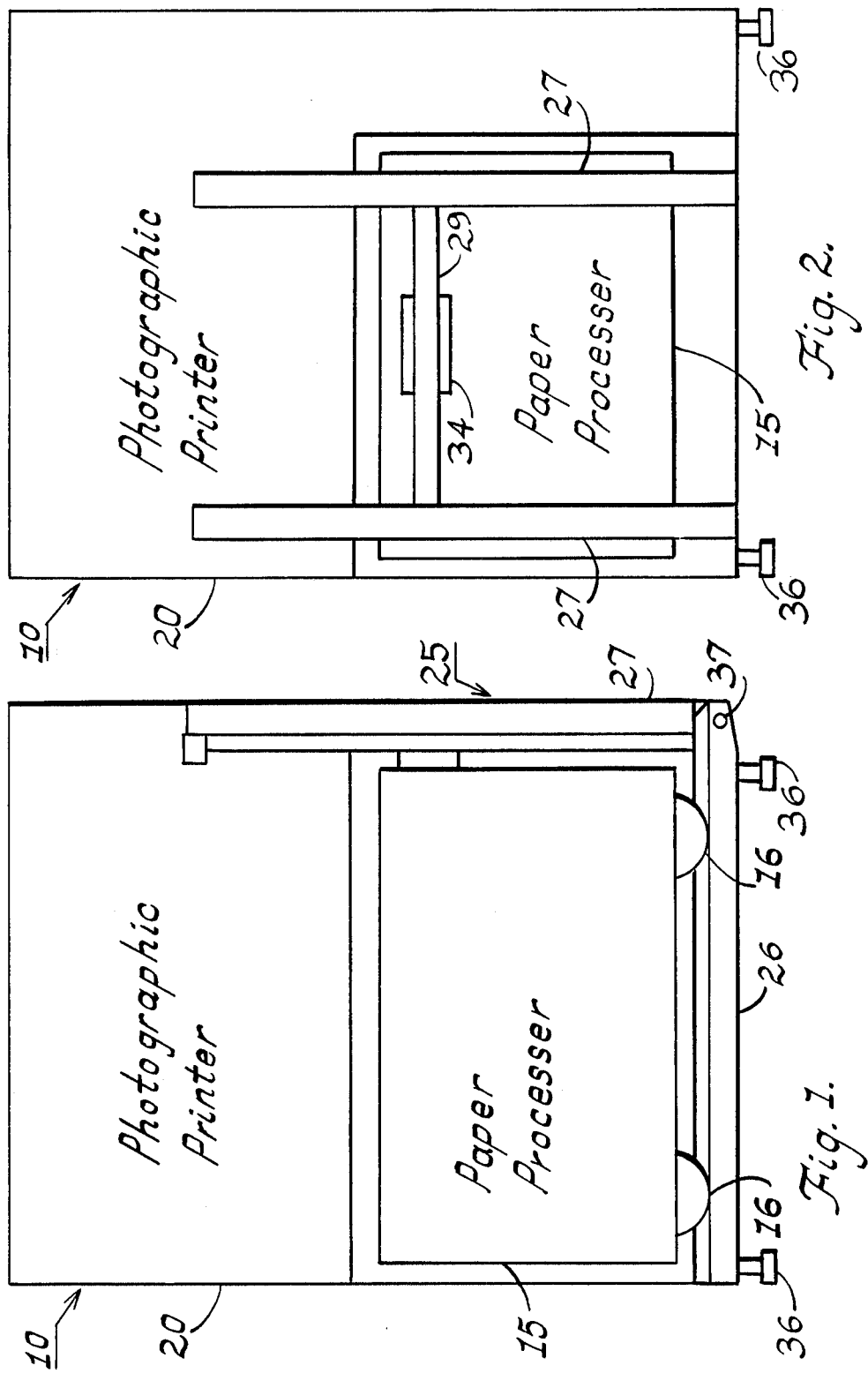

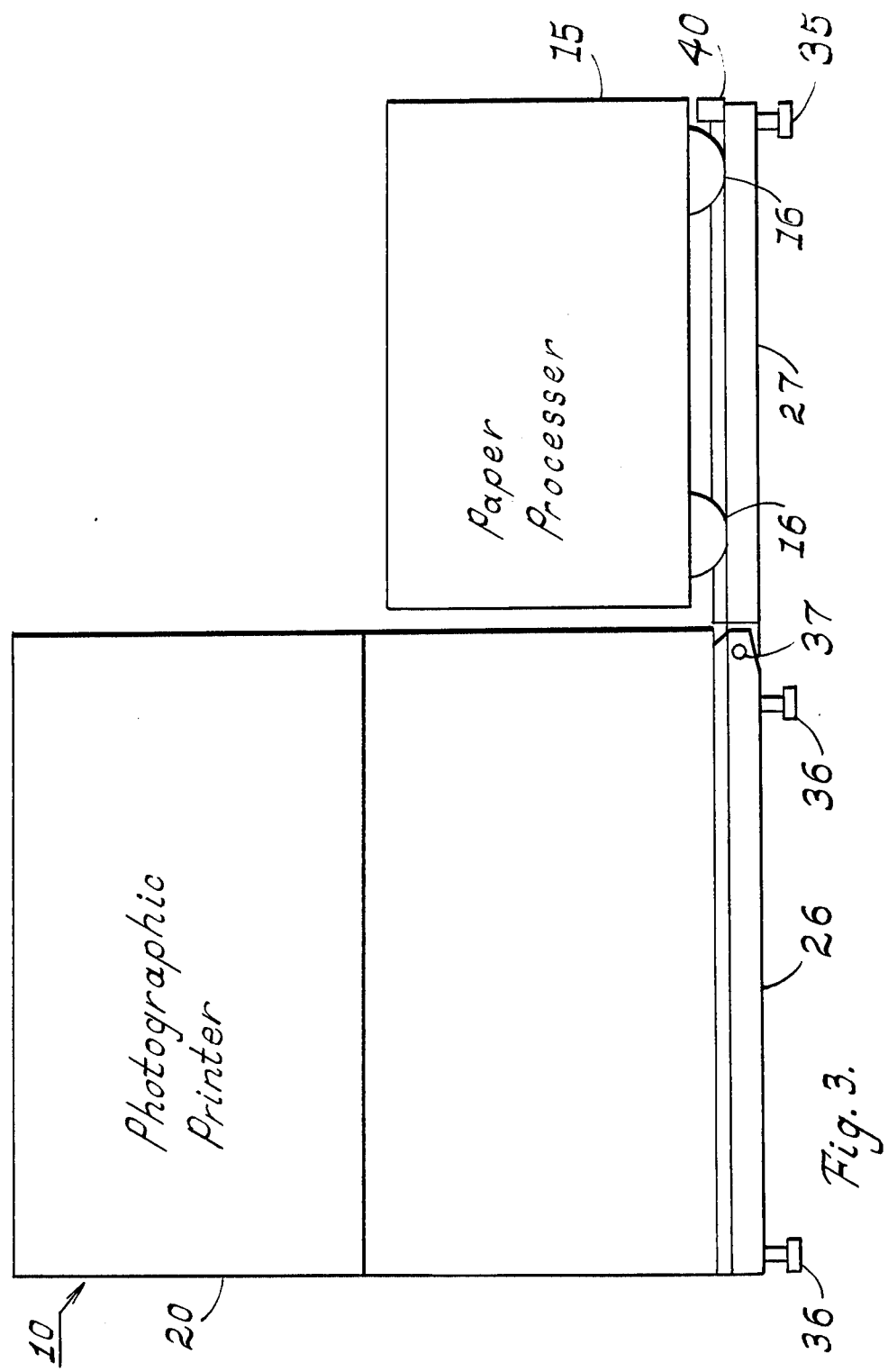

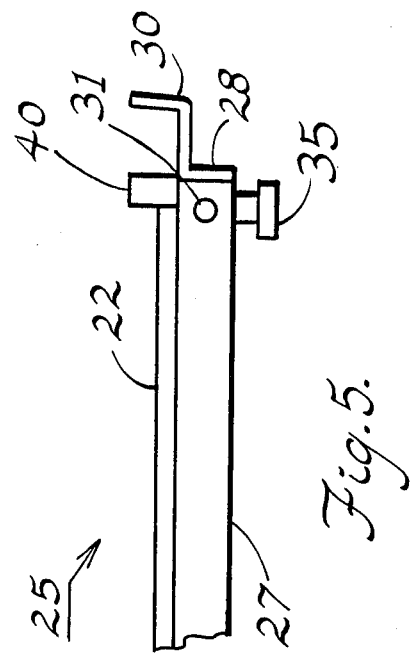
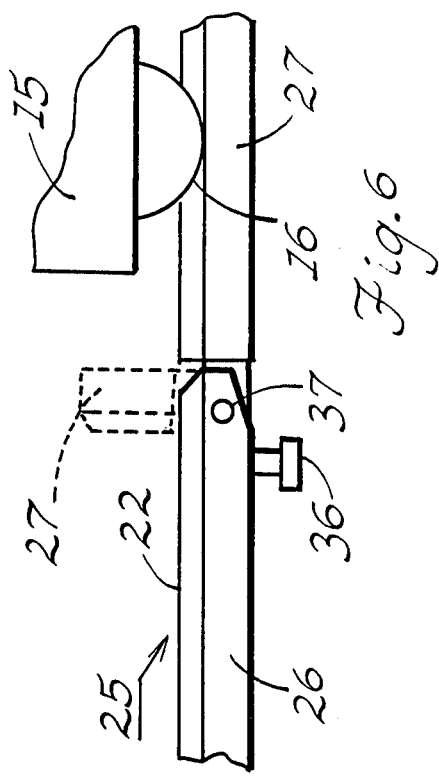
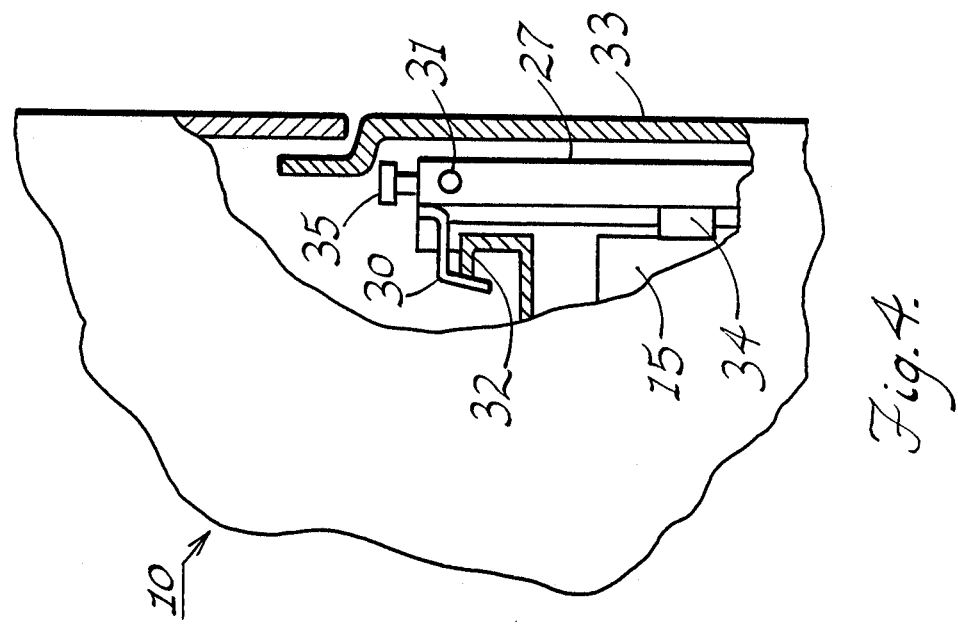

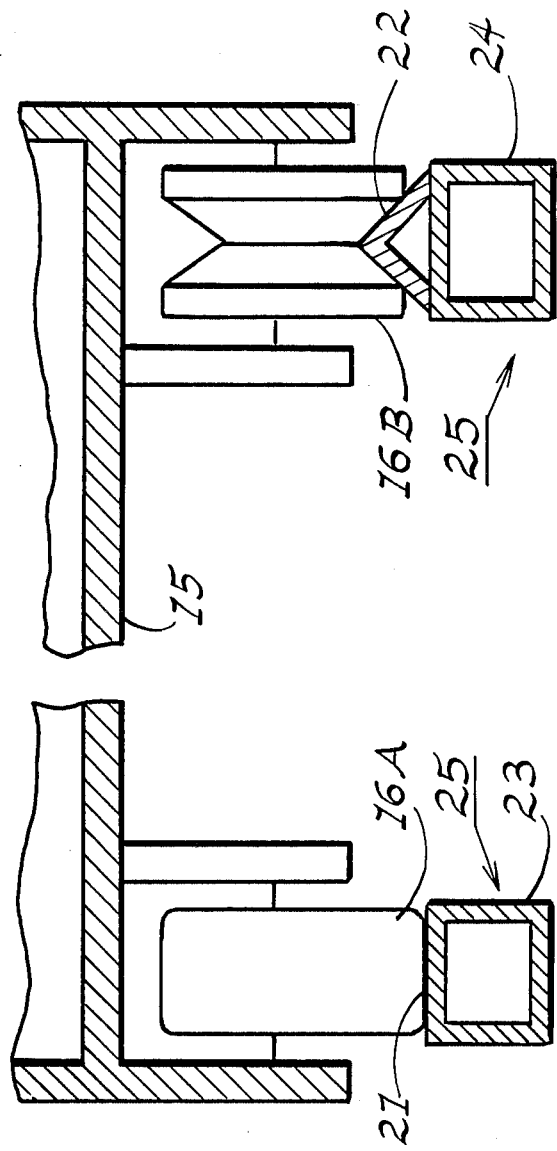

TRACK SYSTEM FOR MOVING PROCESSOR IN AND OUT OF CABINET

BACKGROUND OF THE INVENTION

1. Field of the Invention

This invention relates to processors, such as photographic paper processors, that operate within a cabinet, which may also contain a photographic printer, for example.

2. Description of the Prior Art

A photographic printer and paper processor, combined within a single cabinet, can offer quick and variable sized prints to a customer. With the printer preferably arranged in an upper part of the cabinet, a customer can conveniently select the images and sizes to be printed, and these can be imaged on sheets of photographic paper that are then fed to the paper processor, preferably arranged in a lower part of the cabinet. The processor includes mechanisms for driving the paper sheets through processing solutions and a dryer so that completed prints are promptly delivered to the customer.

The preferred placement of the paper processor in a lower portion of the cabinet, below the photographic printer, makes the processor inconvenient to service in its operating position; and servicing the processor is unavoidable, since its processing solutions need to be replenished occasionally. Paper drive racks, immersed in processing solutions, need to be lifted out of the top of the processor for servicing; and this requires a large free space above the processor, where the photographic printer is preferably arranged, so that the total vertical space requirement becomes excessive. The processor, with its drive mechanisms, print dryer, and processing solutions, is also too heavy for the ordinary devices used to move components in and out of cabinets. So something better is needed for servicing heavy processors, needing overhead clearance.

SUMMARY OF THE INVENTION

To solve these problems, I have devised a track system allowing the processor to be placed on wheels that roll in and out of the cabinet on tracks. I use a pair of parallel tracks that are pivotally mounted on the cabinet to move between a vertical latched position and a horizontal servicing position. When the tracks are pivoted to the horizontal position, one person can easily roll the processor out of the cabinet onto the tracks for servicing and then roll the serviced processor back into the cabinet for operating. When the tracks are pivoted upright and latched to the cabinet, they hold the processor in its operating position within the cabinet. One of the tracks has a guide surface that guides a pair of processor wheels to ensure that the processor returns reliably to its operating position after servicing. A stop, preferably on the guide track, limits movement of the processor outward from the cabinet, and the tracks preferably have leveler feet combined with a latch mechanism. When the tracks are unlatched and pivoted horizontally, the leveler feet are disposed to support the tracks in a proper elevation; and when the tracks are latched in a vertical position, the leveler feet are pivoted clear of a cover that conceals the processor and the track system during operation.

Although my track system was devised for a photographic paper processor, it may also be applied to other heavy processors whose servicing would be facilitated by rolling them out from a cabinet in which they operate.

BRIEF DESCRIPTION OF THE DRAWINGS

FIG. 1 is a schematic, side elevational view of my track system applied to a paper processor operating within a cabinet that includes a photographic printer.

FIG. 2 is a schematic, end elevational view of the track system of FIG. 1.

FIG. 3 is a schematic, side elevational view, similar to the view of FIG. 1, showing a paper processor moved out of a cabinet via my track system.

FIG. 4 is a fragmentary and partially cutaway, schematic side view of the track system of FIGS. 1-3 latched in an upright position within a cabinet behind a cover.

FIG. 5 is a fragmentary, schematic side view of a free end region of the track system of FIGS. 1-3.

FIG. 6 is a fragmentary, schematic side view of a pivot region of the track system of FIG. 1-3.

FIG. 7 is a fragmentary, schematic cross-sectional view of the track system of FIGS. 1-3.

DESCRIPTION OF THE PREFERRED EMBODIMENT

As schematically shown in the drawings, my track system is applied to a photographic paper processor 15 arranged within a cabinet 10 that also includes a photographic printer 20. Processor 15 is preferably in a lower region of cabinet 10, below printer 20, and there are many ways that processors can be arranged in cabinets to be movable via my track system.

I mount processor 15 on wheels 16 to roll on a pair of parallel tracks 25. A fixed portion 26 of tracks 25 is arranged within cabinet 10 to support processor 15 in its operating position, as shown in FIG. 1. A movable portion 27 of tracks 25 is pivotally mounted on cabinet 10 to pivot between an upright position, shown in FIG. 1, and horizontal position, shown in FIG. 3. I prefer using tracks 25, rather than making processor wheels roll on a floor, because of possible interference from carpets or other irregularities.

Tracks 27, when latched upright, hold processor 15 in its operating position within cabinet 10; and when pivoted horizontally, as shown in FIG. 3, tracks 27 allow processor 15 to roll out of cabinet 10 into an accessible servicing position. Electrical connections (not shown) between cabinet 10 and processor 15 are preferably harnessed with sufficient freedom of motion to allow processor 15 to roll back and forth between its operating and servicing positions without requiring any disconnection. In the servicing position shown in FIG. 3, processor 15 is readily accessible for replenishing processing solutions and maintaining or repairing its operating mechanisms.

As shown in FIGS. 4 and 5, tracks 27 have latches 30 pivotally combined with leveler feet 35 at track ends 28. Latches 30 and leveler feet 35 preferably pivot together around pivot axis 31 and detect in either the unlatched position of FIG. 5 or the latched position of FIG. 4. In the unlatched position, leveler feet 35 are disposed under tracks 27, as shown in FIG. 5, to adjust track height to a suitable elevation. A slight decline as processor 15 rolls out of cabinet 10 is preferred so that processor 15 will stay in a servicing position without rolling back into cabinet 10. In the latched position shown in FIG. 4, latch 30 engages a fixed element 32 of cabinet 10 to hold tracks 27 in an upright position. The latch position also disposes leveler feet 35 upward so that a removable cover 33 can fit closely over tracks 27. If latches 30 are not latched over cabinet elements 32, leveler feet 35 interfere with the replacement of cover 30 and thus remind the operator to secure latches 30. There are many ways that cover 33 can be configured for opening or closing or for removal and replacement to ensure that latches 30 are latched before cover 33 is closed or replaced. It is also possible for a single latch mechanism to substitute for the illustrated pair of latches 30, and leveler feet for tracks 27 can be mounted independently of a latch that is structured to interfere with closing or replacing cover 33 until the latch is secure.

Latching tracks 27 in their upright position also secures processor 15 in its operating position within cabinet 10. There are many ways that this can be done, and the schematically illustrated way is by means of a bumper pad 34 pressing against processor 15 and secured to a cross bar 29, extending between tracks 27. Bumper pads or other abutment devices (not shown) also locate the inward end of processor 15 properly in its operating position within cabinet 10.

Cabinet 10, containing fixed tracks 26, is preferably mounted on its own leveler feet 36. Movable tracks 27 are preferably connected to fixed tracks 26 at a pivot 27, shown in FIG. 6. Pivot 37 allows movable tracks 27 to pivot between the vertical, latched position shown in FIGS. 1, 2, and 4, and the horizontal, servicing position shown in FIGS. 3, 5, and 6.

Tracks 25, including fixed tracks 26 and movable tracks 27, are parallel, and as best shown in FIG. 7, include a guide track 24 and a support track 23. Support track 23 preferably has a flat support surface 21 for a generally cylinderical processor wheel 16A. Guide track 24 has a guide surface 22 that is preferably angled as shown in FIG. 7 and is engaged by a pair of processor guide wheels 16B having V-grooves 17 matching the angle of guide surface 22. Guide surface 22 on guide track 24 establishes a line of movement extending along fixed tracks 26 and movable tracks 27; and guide wheels 16B, by following this line of movement, keep processor 15 aligned with its operating position within cabinet 10, while processor 15 is moved in and out of cabinet 10 for servicing. Support wheels 16A, rolling on support surface 21 of tracks 25, carry some of the load of processor 15, without interfering in its directional guidance.

A stop 40, positioned near outer track end 28, preferably on guide track 24, limits outward movement of processor 15 at its servicing position. Stop 40 can be arranged in various ways to engage processor 15 or guide wheels 16, and stop 40 can be combined with a latch mechanism.

I claim:

1. Apparatus comprising
   a. container means;
   b. means for supporting the container means in a manner to permit movement of the container means;
   c. housing means having an opening therein to permit movement of the container means between a first position inside the housing means and a second position outside the housing means;
   d. track means which are pivotally mounted to the housing means for movement between a generally upright position at the opening to prevent movement of the container means from inside the housing means through the opening, and a generally level position to permit movement of the container means such that the container supporting means is in engagement with the track means, to a location outside the housing means;
   e. means for covering the opening when the track means is in the generally upright position;
   f. means for attaching the covering means to the housing means over the track means to cover the opening when the track means is in the generally upright position; and
   g. the track means further including latch means, having a latch portion and a foot portion, which are movable between (i) a first latching position in which the latch portion is engaged with the housing means in a manner to hold the track means in the generally upright position, (ii) a second supporting position in which the foot portion engages a lower surface in order to support the track means in the generally level position.

2. The apparatus as set forth in claim 1 wherein the container means contains a liquid for developing an image onto an image receptive medium.

3. The apparatus as set forth in claim 1 wherein the container supporting means includes rollers which are supported on the track means when the track means are in the generally level position.

4. The apparatus as set forth in claim 1 wherein the latch means is pivotally connected to the track means for movement between the latching position and the supporting position, the foot portion and the latch portion being joined together for pivotal movement in a manner that when the latch means is pivoted for disengagement from the housing means, the foot portion is pivoted below the track means so that the track means is pivotable to the generally level position and is supported thereat in a level manner above the lower surface by the foot portion.

5. The apparatus as set forth in claim 4 wherein the latch portion is pivoted above the track means to engage the housing means and hold the track means in the generally upright position.

6. The apparatus as set forth in claim 5 wherein the latch position is connected to the foot portion in a manner that when the latch portion is pivoted above the track means to engage the housing means, the foot portion is pivoted upwards in a manner to permit the cover to be inserted over the track means to cover the opening.

* * * * *